United States Patent

Todesco et al.

[11] Patent Number: 5,880,186
[45] Date of Patent: Mar. 9, 1999

[54] STABILIZED FILLED POLYOLEFINS

[75] Inventors: Roberto Todesco, Allschwill; Jean-Roch Pauquet, Kaiseraugst, both of Switzerland; Bernd Klingert, Inzlingen, Germany

[73] Assignee: Ciba Specialty Chemicals Corporation, Tarrytown, N.Y.

[21] Appl. No.: 809,479

[22] PCT Filed: Sep. 11, 1995

[86] PCT No.: PCT/EP95/03569

§ 371 Date: Mar. 20, 1997

§ 102(e) Date: Mar. 20, 1997

[87] PCT Pub. No.: WO96/09343

PCT Pub. Date: Mar. 28, 1996

[30] Foreign Application Priority Data

Sep. 23, 1994 [CH] Switzerland ............. 2909/94-0

[51] Int. Cl.⁶ .................................. C08K 3/34
[52] U.S. Cl. ............................. 524/100; 524/451
[58] Field of Search ....................... 524/451, 495, 524/427, 437, 102, 103, 104, 100

[56] References Cited

U.S. PATENT DOCUMENTS

| | | | |
|---|---|---|---|
| 4,316,025 | 2/1982 | Cantatore et al. | 544/364 |
| 4,442,250 | 4/1984 | Cantatore | 524/98 |
| 4,859,724 | 8/1989 | Cantatore et al. | 524/91 |
| 5,004,759 | 4/1991 | Mutterer et al. | 524/89 |
| 5,306,495 | 4/1994 | Cantatore et al. | 514/100 |
| 5,324,834 | 6/1994 | Borzatta et al. | 544/194 |
| 5,342,862 | 8/1994 | Reich | 524/495 |
| 5,352,719 | 10/1994 | Myers | 524/102 |
| 5,439,959 | 8/1995 | Raspanti | 524/100 |

FOREIGN PATENT DOCUMENTS 0446171  9/1991  European Pat. Off. .

OTHER PUBLICATIONS

F. Henninger, Heat & Light Stabilization of Filled Polypropylene, 4th Technical Seminar Seminar for Polymers, Oct. 1986.

D. Davidson et al., Stabilization of Filled Polypropylene, ANTEC '85, pp. 977–981.

Derw. Abst. 91–269006 [37] of EP 446,171.
Derw. Abst. 88–176725 [26] of EP 272,859.

Primary Examiner—Veronica P. Hoke
Attorney, Agent, or Firm—Luther A. R. Hall

[57] ABSTRACT

The invention relates to stabilized filled polyolefins comprising a filler and a macrocyclic compound which contains a radical of formula

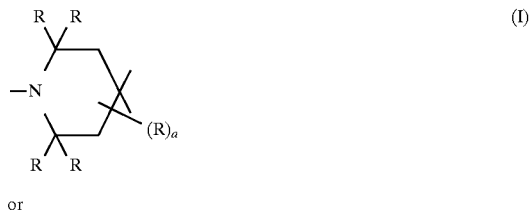

(I)

or

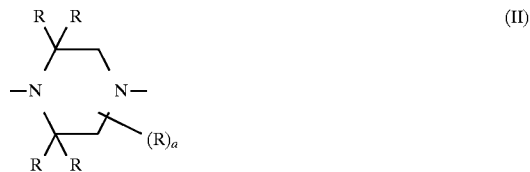

(II)

in the macrocyclic structure or in a side-group, said macrocyclic structure consisting of at least 8 atoms and wherein the substituents R are each independently of one another methyl, ethyl or propyl, or two substituents R at the same carbon atom are together also a pentamethylene radical, and a is 0, 1 or 2. The invention also relates to a method of stabilizing filled polyolefins and to the use of the macrocyclic compounds as stabilizers.

6 Claims, No Drawings

STABILIZED FILLED POLYOLEFINS

The present invention relates to stabilised filled polyolefins and to a method of stabilising said polyolefins and to the use of a stabiliser therefor.

Mineral fillers are frequently often added to polyolefins. Such filled polyolefins often have a poorer stability (especially stability to heat and light) than analogous polyolefins that do not contain fillers. Performance can to some extent be improved by increasing the concentration of conventional stabilisers. The addition of epoxies is also recommended (inter alia in "Stabilization of Filled Polypropylene", ANTEC'85, page 977 et seq.) to reduce the adverse action of the fillers on the thermal stability. But such addition is usually associated with reduced light stability. Hence there is still a need to enhance the stabilisation of filled polyolefins.

It is therefore the object of this invention to provide a stabilised filled polyolefin which has improved long-term stability and improved stability to weathering.

It has now been found that, in the presence of macrocyclic compounds containing specific piperidine or piperazine groups, it is possible to stabilise filled polyolefins in simple and economic manner against thermal, oxidative and actinic degradation during processing and subsequent use.

Accordingly, the invention relates to stabilised filled polyolefins comprising a filler and 0.01 to 5% by weight, based on the polymer, of at least one macrocyclic compound which contains a radical of formula

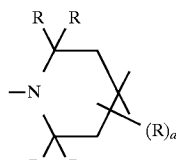

(I)

or

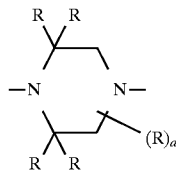

(II)

in the macrocyclic structure or in a side-group, said macrocyclic structure consisting of at least 8 atoms, and wherein the substituents R independently of one another are methyl, ethyl or propyl, preferably methyl, or two substituents R at the same carbon atom are also together a pentamethylene radical and a is 0, 1 or 2, preferably 0.

Those macrocyclic compounds are preferred in which the macrocyclic structure contains at least 9 atoms, and those compounds are most preferred in which the macrocyclic structure contains at least 9 and at most 50 atoms.

It is preferred to use 0.1 to 2% by weight, based on the polymer, of the above macrocyclic compound.

Within the scope of this invention, fillers will be understood as meaning in particular mineral fillers. Suitable mineral fillers are typically carbonates (preferably calcium carbonates such as chalk), silicates (preferably talc, kaolin, mica, wollastonite and silica), aluminium trihydrate, carbon black and titanium dioxide. Among the preferred fillers comprising chalk, talc, kaolin, mica, wollastonite and silica, talc is very particularly preferred. A single filler as well as a blend of two or more fillers may also be used. Such a blend of fillers will typically comprise talc and carbon black or talc and titanium dioxide.

Filled polyolefines will usually contain 5–75% by weight, preferably 10–40% by weight, of filler, in each case based on the weight of the polyolefin.

By polyolefins are meant homopolymers of an α-olefin, random, alternating or block-copolymers of two or more than two (α-olefins or copolymers of an α-olefin with one or more than one unsaturated copolymerisable compound such as polyethylene (PE), low density polyethylene (LDPE), low density linear polyethylene (LDLPE) and high-density polyethylene (HDPE), and also copolymers such as ethylene-propylene (EPM) and ethylene-propylene-diene copolymers (EPDM) as well as ULDPE and MDPE; furthermore polypropylene (PP) and polypropylene blends and copolymers such as PP/EPDM and PP/PE. These polymers can be further modified by grafting. Preferred polyolefins are polyethylene, polypropylene and copolymers thereof, homo- and copolymers of polypropylene being very particularly preferred.

A macrocyclic compound containing piperidine or piperazine groups is preferably a macrocyclic compound selected from the compounds of the following formulae (III) to (VI), those compounds of formulae (IV) and (V) being particularly preferred:

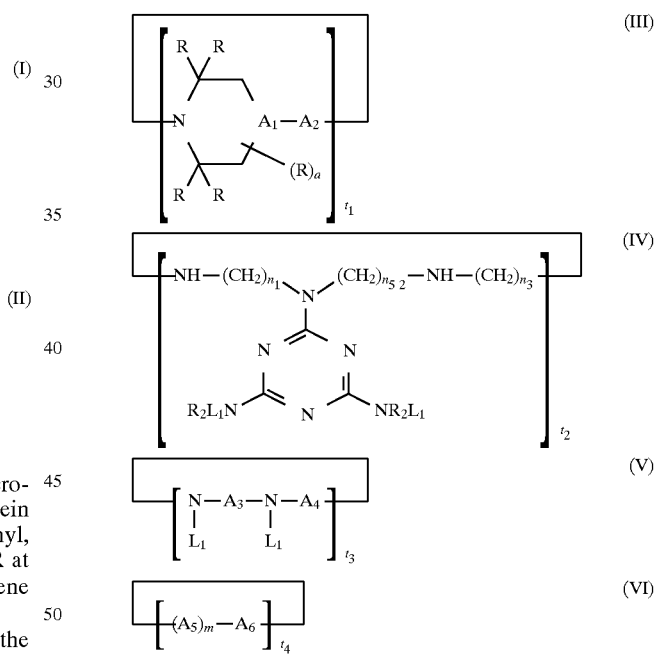

wherein $L_1$ is the radical

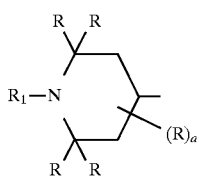

(Ia), and $A_1$ is >CH— or nitrogen or a substituted carbon atom (*C) of formula

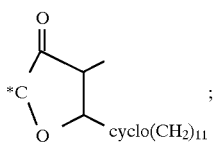

$A_2$ is $C_1$–$C_{12}$alkylene, $C_4$–$C_{12}$alkenylene, xylylene, a divalent radical of an aliphatic, cycloaliphatic, araliphatic or aromatic dicarboxylic acid, dicarbamic acid or phosphorus-containing acid, or is a divalent silyl radical, preferably a radical of an aliphatic dicarboxylic acid containing 2 to 36 carbon atoms, of a cycloaliphatic or aromatic dicarboxylic acid containing 8 to 14 carbon atoms, or of an aliphatic, cycloaliphatic or aromatic dicarbamic acid containing 8 to 14 carbon atoms;

$A_3$ and $A_4$ are each independently of the other $C_1$–$C_{12}$alkylene, $C_2$–$C_{12}$alkylene which is interrupted by oxygen, sulfur or $NR_4$, $C_4$–$C_{12}$alkenylene, xylylene or a divalent triazine radical of formula

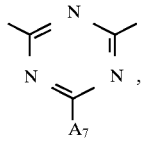

preferably $C_1$–$C_{12}$alylene, $C_2$–$C_{12}$alkylene which is interrupted by oxygen, sulfur or $NR_4$, or a divalent triazine radical of formula

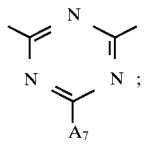

$A_5$ is a radical of formula

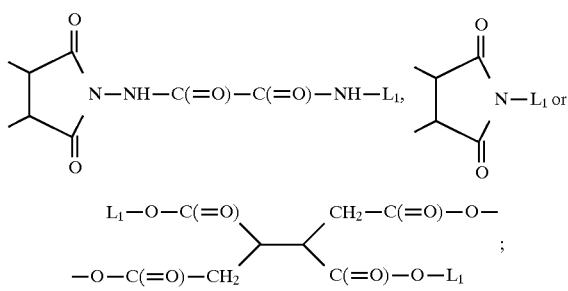

$A_6$ is a radical of formula

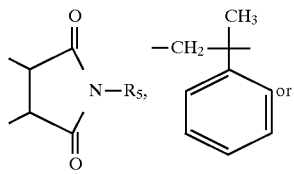

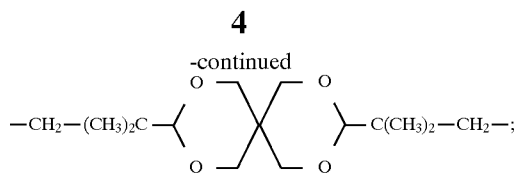

$A_7$ is $-OR_6$, $-SR_6$ or $-NR_4R_6$; the substituents

R are each independently of one another methyl, ethyl, propyl, or two substituents R at the same carbon atom are also together a pentamethylene radical, preferably methyl;

$R_1$ is hydrogen, oxyl, hydroxyl, $C_1$–$C_{12}$ally, $C_3$–$C_8$alkenyl, $C_3$–$C_8$alkynyl, phenyl-$C_1$–$C_6$alkyl, $C_1$–$C_{18}$alkoxy, $C_5$–$C_8$cycloalkoxy, $C_7$–$C_9$phenylalkoxy, $C_1$–$C_8$alkanoyl, $C_3$–$C_5$alkenoyl, $C_1$–$C_{18}$alkanoyloxy, benzyloxy, glycidyl or a group $-CH_2CH(OH)-R_3$, preferably hydrogen, $C_1$–$C_4$alkyl, allyl, benzyl, acetyl or acryloyl; the substituents $R_2$ are each independently of one another hydrogen or $C_1$–$C_{12}$alkyl;

$R_3$ is hydrogen, methyl or phenyl;

$R_4$ is hydrogen, $C_1$–$C_{12}$alkyl, or $R_4$ taken together with $R_6$ are $-(CH_2)_2-O-(CH_2)_2-$;

$R_5$ is $C_1$–$C_{18}$alkyl;

$R_6$ is hydrogen, $C_1$–$C_{18}$alkyl, $C_1$–$C_{18}$-ω-hydroxyalkyl, $C_1$–$C_{18}$-ω-$C_1$–$C_{18}$alkoxyalkyl, $C_3$–$C_{18}$alkenyl, $C_5$–$C_{18}$cycloalkyl, unsubstituted or substituted phenyl, unsubstituted or substituted phenyl-$C_1$–$C_6$alkyl, $-CH_2-C(=O)-O-R_5$, or $R_6$ taken together with $R_4$ are $-(CH_2)_2-O-(CH_2)_2-$, preferably $C_1$–$C_{12}$alkyl, $C_3$–$C_{12}$alkenyl, $C_5$–$C_{12}$cycloalkyl, phenyl, phenyl-$C_1$–$C_4$-alkyl, $-CH_2-C(=O)-O-R_5$, or $R_6$ taken together with $R_4$ are $-(CH_2)_2-O-(CH_2)_2-$;

a is 0, 1 or 2, preferably 0;

m is 1, 2 or 3, preferably 1;

$n_1$, $n_2$ and $n_3$ are each independently of one another a number from 1 to 12, and are preferably 2, 3, 4 or 6; and $t_1$, $t_2$, $t_3$ and $t_4$, are each independently of one another a number from 1 to 12, and are preferably a number from 1 to 6.

Substituents defined in the above formulae as alkyl of up to 18 carbon atoms may suitably be methyl, ethyl, propyl, butyl, pentyl, hexyl, heptyl, octyl, nonyl, decyl, undecyl, dodecyl, tetradecyl, hexadecyl or octadecyl, as well as corresponding branched isomers.

Substituents defined in the above formulae as cycloalkyl containing up to 18 carbon atoms may suitably be cyclohexyl, cyclooctyl, cycloundecyl, cyclododecyl.

Substituents defined in the above formulae as ω-hydroxyalkyl containing up to 18 carbon atoms may suitably be 2-hydroxyethyl, 3-hydroxypropyl, 4hydroxybutyl, as well as radicals analogous to the above alkyl radicals.

Substituents defined in the above formulae as ω-alkoxyalkyl containing up to 36 carbon atoms may suitably be radicals such as 2-ethoxyethyl, 3-ethoxypropyl, 4-ethoxybutyl, as well as radicals analogous to the above alkyl radicals.

Substituents defined in the above formulae as alkylene containing up to 12 carbon atoms may suitably be radicals such as ethylene, 1,2- or 1,3-propylene, tetramethylene, pentamethylene, hexamethylene, as well as radicals analogous to the above alkyl radicals.

Substituents defined in the above formulae as alkylene containing up to 12 carbon atoms which is interrupted by oxygen, sulfur or $NR_4$ may suitably be $-(CH_2)_2-O-(CH_2)_2-$, $-(CH_2)_3-O-(CH_2)_3-$, $-[(CH_2)_2-O-(CH_2)_2]_{2-3}-$, $-(CH_2)_2-S-(CH_2)_2-$, $-(CH_2)_2-S-(CH_2)_3-$, $-[(CH_2)_2-S-(CH_2)_2]_{2-3}-$, $-(CH_2)_2-NH-(CH_2)_2-$, $-(CH_2)_3-NH-(CH_2)_3-$, $-[(CH_2)_2-NH-(CH_2)_2]_{2-3}-$, $-(CH_2)_2-N(CH_2CH_3)-(CH_2)_2-$, $-(CH_2)_3-N(CH_2CH_3)-(CH_2)_3-$, as well as radicals analogous to the above alkylene radicals.

Substituents defined in the above formulae as alkoxy containing up to 18 carbon atoms may suitably be radicals such as methoxy or ethoxy, as well as radicals analogous to the above alkyl radicals.

Substituents defined in the above formulae as alkanoyl containing up to 8 carbon atoms may suitably be radicals such as formyl, acetyl, propionyl, butyryl or octanoyl.

Substituents defined in the above formulae as alkanoyloxy containing up to 18 carbon atoms may suitably be radicals such as acetoxy, propionyloxy, butyryloxy or octanoyloxy.

Substituents defined in the above formulae as cycloalkoxy containing up to 8 carbon atoms may suitably be radicals such as cyclohexyloxy or cyclooctyloxy.

Substituents defined in the above formulae as phenylalkoxy containing up to 12 carbon atoms may suitably be radicals such as

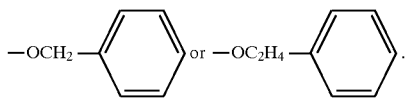

Substituents defined in the above formulae as alkenyl containing up to 18 carbon atoms may suitably be radicals such as vinyl, prop-1-enyl ($-CH=CH-CH_3$) or prop-2-enyl ($-CH_2-CH=CH_2$), as well as radicals analogous to the above alkyl radicals.

Substituents defined in the above formulae as alkenylene containing up to 12 carbon atoms may suitably be radicals such as 1,2- or 1,3-prop-1-enylene, 1,4-but-1-enylene, 1,4-but-2-enylene, 1,2-but-3-enylene, as well as radicals analogous to the above alkylene radicals.

Substituents defined in the above formulae as alkenoyl containing up to 8 carbon atoms may suitably be radicals such as acryloyl.

Substituents defined in the above formulae as alkynyl containing up to 8 carbon atoms may suitably be radicals such as prop-1-ynyl, prop-2-ynyl, but-1-ynyl, but-2-ynyl, as well as radicals analogous to the above alkenyl radicals.

Substituents defined in the above formulae as phenyl-$C_1$-$C_6$alkyl may suitably be radicals such as

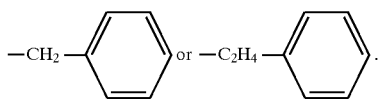

Substituents defined in the above formulae as dicarboxylic acid radicals may suitably be radicals of malonic acid, succinic acid, glutaric acid, adipic acid, suberic acid, sebacic acid, maleic acid, itaconic acid, phthalic acid, dibutylmalonic acid, dibenzylmalonic acid, or radicals of butyl-(3,5-di-tert-butyl-4-hydroxybenzyl)malonic acid, bicycloheptenedicarboxylic acid, hexamethylenedicarbamic acid or 2,4-toluylenedicarbamic acid.

Substituents of phenyl radicals will be understood as meaning 1 to 5, preferably 1 or 2, substituents such as $C_1$-$C_8$alkyl, $C_1$-$C_8$alkoxy or $-OH$.

A particularly preferred piperidine or piperazine group-containing macrocyclic compound is that of formula

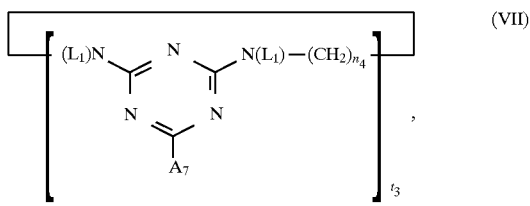

(VII)

wherein $L_1$ is the radical

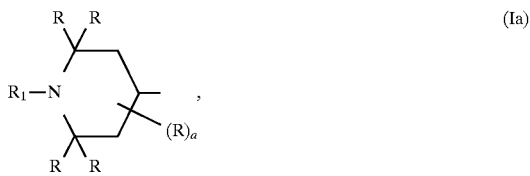

(Ia)

(Ia), and $A_7$ is $-NR_4R_6$;

R is methyl;

$R_1$ is hydrogen, oxyl, hydroxyl, $C_1$-$C_{12}$alkyl, $C_3$-$C_8$alkenyl, phenyl-$C_1$-$C_6$alkyl, $C_1$-$C_{18}$alkoxy, $C_3$-$C_5$alkenoyl or $C_1$-$C_{18}$alkanoyloxy, preferably hydrogen, $C_1$-$C_4$alkyl, allyl, benzyl, acetyl or acryloyl;

$R_4$ is hydrogen, $C_1$-$C_{12}$alkyl, or $R_4$ taken together with $R_6$ are $-(CH_2)_2-O-(CH_2)_2-$;

$R_5$ is $C_1$-$C_{18}$alkyl;

$R_6$ is $C_1$-$C_{18}$alkyl, $C_3$-$C_{18}$alkenyl, $C_5$-$C_{18}$cycloalkyl, unsubstituted or substituted phenyl, unsubstituted or substituted phenyl-$C_1$-$C_6$alkyl, $-CH_2-C(=O)-O-R_5$, or $R_6$ taken together with $R_4$ are $-(CH_2)_2-O-(CH_2)_2-$, preferably $C_1$-$C_{12}$alkyl, $C_3$-$C_{12}$alkenyl, $C_5$-$C_{12}$cycloalkyl, phenyl, phenyl-$C_1$-$C_4$alkyl, $-CH_2-C(=O)-O-R_5$, or $R_6$ taken together with $R_4$ are $-(CH_2)_2-O-(CH_2)_2-$;

a is 0, 1 or 2, preferably 0;

$n_4$ is a number from 1 to 12, preferably 2, 3, 4 or 6; and $t_3$ is a number from 1 to 4, preferably 1 or 2.

A very particularly preferred piperidine or piperazine group-containing macrocyclic compound is that of formula (VII) as described above in which $R_4$ is hydrogen, or $R_4$ taken together with $R_6$ are $-(CH_2)_2-O-(CH_2)_2-$, and $R_6$ is $-C(CH_3)_2-CH_2-C(CH_3)_3$, phenyl, $-CH_2-C(=O)-O-R_5$, or $R_6$ taken together with $R_4$ are $-(CH_2)_2-O-(CH_2)_2-$.

A preferred embodiment of the invention is also a stabilised filled polyolefin comprising a filler and 0.01 to 5% by weight, based on the polymer, of a mixture of compounds of formulae VII-A and VII-B

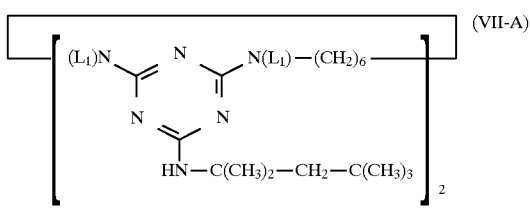

(VII-A)

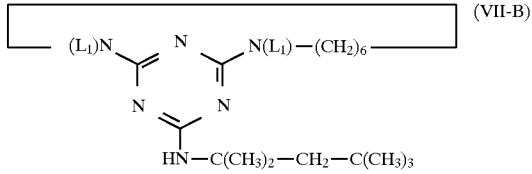

wherein $L_1$:

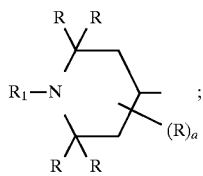

R:—$CH_3$; $R_1$: H; and a=0 in a ratio (parts by weight) of 10:1 to 1:10, preferably of 10:1 to 1:1 or 5:1 to 1:1. A particularly preferred ratio of compounds (VII-A):(VII-B) is 7:3.

The above-described macrocyclic compounds are disclosed, inter alia, in U.S. Pat. No. 4,442,250, U.S. Pat. No. 5,004,759 and EP-A-0 446 171, or they can be prepared by the methods described therein.

Still further additives may be added to the filled polyolefin in the practice of this invention. Such further additives will depend on the intended use of the polyolefin. Illustrative examples of such further additives are:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures thereof.

1.2. Alkclthiomethyliphenols, for example 2,4-dioctylthiomethyl-6-tert-butylphenol, 2,4-dioctylthiomethyl-6-methylphenol, 2,4-dioctylthiomethyl-6-ethylphenol, 2,6-di-do-decylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

1.4. Tocopherols, for example α-tocopherol, β-tocopherol, 65 -tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl- 6-(α-methylcyclohexyl)phenol]2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl) -4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis (5-tert-butyl4hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.

1.7. O-, N- and S-benzyl compounds, for example 3,5,3', 5'-tetra(tert-butyl-4,4'-dihydroxydibenzyl) ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)-amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl4hydroxybenzylmercaptoacetate.

1.8. Hydroxybenzylated malonates, for example dioctadecyl-2,2-bis(3,5-di-tert-butyl-2-hydroxybenzyl) malonate, dioctadecyl-2-(3-tert-butyl-4-hydroxy-5-methylbenzyl)malonate, didodecylmercaptoethyl-2,2-bis-(3,5-di-tert-butyl-4-hydroxybenzyl)malonate, bis[4-(1,1,3, 3-tetramethylbutyl)phenyl]-2,2-bis(3,5-di-tert-butyl-4-hydroxybenzyl)malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazines, for example 2,4-bis(octylmercapto)-6-(3, 5-di-tert-butyl-4-hydroxyanilino)-1,3,5-triazine, 2-octylmercapto-4,6-bis(3,5-di-tert-butyl-4-hydroxyanilino) -1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy- 2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl) hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl4hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminoihenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, isooctanol, octadecanol, 1,6- hexanediol, 1,9-nonanediol, ethylene glycol, 1,2-propanediol, neopentyl glycol, thiodiethylene glycol, diethylene glycol, triethylene glycol, pentaerythritol tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo-[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with- mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-3,5-di-tert-butyl-4-hydroxyphenyl) propionic acid, e.g. N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediaimine, N,N'-bis(3,5-di-tert-butyl-4-hydroxyphenylpropionyl)hydrazine.

2. UV absorbers and light stabilisers 2.1.2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotrazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5chlorobenzotriazole, 2-(3'-tert-butyl-2'-hydroxy-5-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benztriazole, and 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotiazo-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$–]$_2$, where R=3'-tert-butyl-4'-hydroxy-5'-2H-benzotriazole-2-ylphenyl.

2.2.2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butyl-phenyl salicylate, phenyl salicylate, octylphenyl salicylate, dibenzoyl resorcinol, bis(4-tert-butyl-benzoyl) resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, metyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Linear sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis-(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, the condensate of N,N'-bis(2,2,6,6-tetramethyl-4-piperidyl)hexamethylenediamine and 4-morpholino-2,6-dichloro- 1,3,5-triazine, the condensate of 2-chloro-4,6-bis(4-n-butylamino-2,2,6,6-tetramethylpiperidyl )- 1,3,5-triazine and 1,2-bis(3-aminopropylamino)ethane, the condensate of 2-chloro-4,6-bis(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)

pyrrolidine-2,5-dione, 3-dodecyl-1-(1,2,2,6,6-pentamethyl-4-piperidyl)pyrrolidine-2,5-dione, a mixture of 4-hexadecyloxy and 4stearyloxy-2,2,6,6-tetramethylpiperidine, a condensation product of N,N'-bis-(2,2,6,6-tetramethyl-4piperidyl)hexamethylenediamine and 4-cyclohexylamino-2,6-di-chloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl- 1-oxa-3,8-diaza-4-oxo-spiro[4,5]decane, a reaction product of 7,7,9,9-tetramethyl-2-cycloundecyl-1-oxa-3,8-diaza4oxospiro[4,5]decane und epichlorohydrin.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and the mixture thereof with 2-ethoxy-2'-ethyl-5,4'-di-tert-butoxanilide and mixtures of ortho- and para-methoxy-disubstituted oxanilides and mixtures of o- and p-ethoxy-disubstituted oxanilides.

2.8.2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl4,6-diphenyl-1,3,5-triazine, 2-(2-hydroxy-4-methoxyphenyl)-4,6-diphenyl-1,3,5-triazine, 2,4,6-tris[2-hydroxy-4-( 3-butoxy-2-hydroxy-propoxy)phenyl]-1,3,5-triazine, 2-(2-hydroxyphenyl)-4-(4-methoxyphenyl)-6-phenyl-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole,bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerydiritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerytliritol diphosphite, bis(2,4-di-tert-butyl-6-methylphenyl)pentaerythritol diphosphite, bis(2,4,6-tris(tert-butylphenyl)-pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenzo-[d,g]-1,3,2-dioxaphosphocine, 6-fluoro-2,4,8,10-tetra-tert-butyl-12-methyl-dibenzo-[d,g]-1,3,2-dioxaphosphocine, bis(2,4-di-tert-butyl-6-methylphenyl)methylphosphite, bis(2,4-di-tert-butyl-6-methylphenyl)ethylphosphite.

5. Peroxide scavengers, for example esters of β-thiodipropionic acid such as the lauryl, stearyl, myristyl or tridecyl esters, mercaptobenzimidazole or the zinc salt of 2-mercaptobenzimidazole benzimidazole, zinc dibutyldithiocarbamate, dioctadecyl disulfide, pentaerythritol tetrakis(β-dodecylmercapto)propionate.

6. Polyamide stabilisers, for example copper salts in combination with iodides and/or phosphorus compounds and salts of divalent manganese.

7. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, e.g. calcium stearate, zinc stearate, magnesium behenate, magnesium stearate, sodium ricinolate and potassium palmitate, antimony pyrocatecholate or tin pyrocatecholate.

8. Nucleating agents, for example 4-tert-butylbenzoic acid, adipic acid, diphenylacetic acid.

9. Other additives, for example plasticisers, lubricants, emulsifiers, pigments, fluorescent whiening agents, flame retardants, antistatic agents, blowing agents.

10. Benzofuranones and indolinones, as disclosed, inter alia, in U.S. Pat. No. 4,325,863, U.S. Pat. No. 4,338,244, U.S. Pat. No. 5,175,312, U.S. Pat. No. 5,216,052, U.S. Pat. No. 5,252,643, DE-A-4 316 611, DE-A-4 316 622, DE-A-4 316 876, EP-A-0 589 839 or EP-A-0 591 102, or 3-[4-(2-acetoxyethoxy)phenyl]-5,7-di-tert-butylbenzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]-phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butylbenzofuran-2-one.

A compound of the series of the benzophenones, benzotriazoles, oxalanilides or of the linear sterically hindered amines is preferably additionally blended with the polyolefm as light stabiliser or UV absorber.

A compound of group 5 above is preferably additionally blended with the polyolefm.

A compound of group 2.6 above is also preferably addtionally blended with the polyolefin.

Particularly preferred embodiments of the invention are:

A) a stabilised filled polyolefin comprising a filler and 0.01 to 5% by weight, based on the polymer, of a mixture of compounds VII-A and VII-B and, additionally, bis(2,2,6,6-tetramethyl-4-piperidyl) sebacate (®Tinuvin 770);

B) a stabilised filled polyolefin comprising a filler and 0.01 to 5% by weight, based on the polymer, of a mixture of compounds VII-A and VII-B and, additionally, the condensate of N,N'-bis(2,2,6,6-tetramethyl-4-piperidyl)hexamethylenediamine and 4-tert-octylamino-2,6-dichloro-1,3,5-s-triazine (®Chimassorb 944);

C) a stabilised filled polyolefin comprising a filler and 0.01 to 5% by weight, based on the polymer, of a mixture of compounds VII-A and VII-B and, additionally, the condensate of 2-chloro-4,6-bis(4-n- butylamino-1,2,2,6,6-pentamethyl-4-piperidyl)-1,3,5-triazine and 1,2-bis(3-aminopropylamino)ethane (®Chimassorb 119);

D) a stabilised filled polyolefin comprising a filler and 0.01 to 5% by weight, based on the polymer, of a mixture of compounds VII-A and VII-B and, additionally, bis(2,2,6,6-tetramethyl-4-piperidyl) sebacate and the condensate of N,N'-bis(2,2,6,6-tetramethyl-4-piperidyl)hexamethylenediamine and 4-tert-octylamino-2,6-dichloro-1,3,5-s-triazine;

E) a stabilised filled polyolefin comprising a filler and 0.01 to 5% by weight, based on the polymer, of a mixture of compounds VII-A and VII-B and, additionally, bis(2,2,6,6-tetramethyl-4-piperidyl) sebacate and the condensate of 2-chloro-4,6-bis(4-n-butylamino-1,2,2,6,6-pentamethyl-4-piperidyl)-1,3,5-triazine and 1,2-bis(3-aminopropylamino)ethane.

0.01 to 2% by weight of at least one sterically hindered phenol (groups 1.13 to 1.17 above) and/or 0.01 to 2% by weight of at least one organic phosphite or phosphonite (group 4 above) may additionally preferably be blended with the filled polyolefm. A weight ratio of phenol:ester of 20:1 to 1:20 is preferred, a weight ratio of 10:1 to 1:10 being particularly preferred and a weight ratio of 4:1 to 1:4 being very particularly preferred.

Also useful are polyolefin compositions as described above additionally comprising a metal-soap such as an organic zinc, magnesium or calcium compound of the series of the aliphatic saturated $C_1$–$C_{22}$carboxylates, of the aliphatic olefinic $C_2$–C22carboxylates, of the aliphatic $C_2$–$C_{22}$carboxylates which are substituted by at least one OH group, of the cyclic and bicyclic carboxylates containing 5–22 carbon atoms, of the aromatic $C_6$–$C_{22}$carboxylates, of the aromatic $C_6$–$C_{22}$carboxylates which are substituted by at least one OH group, of the $C_1$–$C_{16}$alkyl-substituted phenylcarboxylates, of the phenyl-$C_1$–$C_{16}$alkylcarboxylates, of the $C_6$–$C_{18}$phenolates, of the $C_5$–$C_{26}$chelates of 1,3-diketones or β-ketocarboxylic acid esters, of dehydroacetic acid and derivatives thereof, of the mercaptides derived from mercaptocarboxylic acid esters and of the glycinates.

Furthermore, an acid acceptor such as a zeolite or lactate or, preferably, a hydrotalcite may conveniently be added to the polyolefin.

In another of its aspects, the invention relates to a method of stabilising filled polyolefins, which comprises adding to the polymer 0.01 to 5% by weight, based on the polymer, of at least one macrocyclic compound which contains a radical of formula

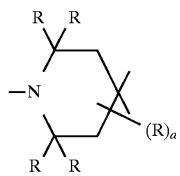
(I)

or

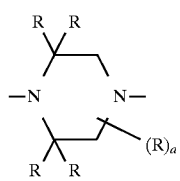
(II)

in the macrocyclic structure or in a side-group, said macrocyclic structure consisting of at least 8 atoms, and wherein the substituents R are each independently of one another methyl, ethyl or propyl, preferably methyl, or two substituents R at the same carbon atom are together also a pentamethylene radical, and a is 0, 1 or 2, preferably 0.

In yet another of its aspects, the invention relates to the use of at least one macrocyclic compound which contains a radical of formula

(I)

or

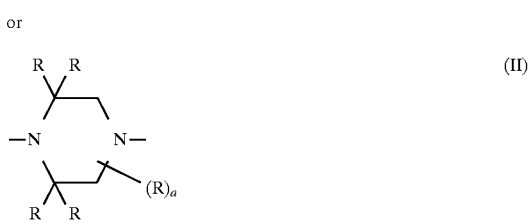
(II)

in the macrocyclic structure or in a side-group, said macrocyclic structure consisting of at least 8 atoms, and wherein the substituents R are each independently of one another methyl, ethyl or propyl, preferably methyl, or two substituents R at the same carbon atom are together also a pentamethylene radical, and a is 0, 1 or 2, preferably 0, for stabilising filled polyolefins.

The preferences outlined in detail above in respect of the stabilised filled polyolefins apply in like manner to the method of the invention and to the claimed utility.

The stabiliser or blend comprising said stabiliser and the optional additives referred to above can be added to the polymer in compacted, extruded form or on a substrate or also direct as blend or in the form of a powder. The stabilisers can be added singly or in admixture or in the form of masterbatches.

The filled polyolefins stabilised in the practice of this invention can be brought into the desired form by known methods. Such methods typically include milling, calendering, extruding, injection moulding, sintering or spinning, and also extrusion blowing or processing by the plastisol process.

The filled polyolefins stabilised in this manner can be used for a wide variety of purposes, typically for pipes, profiles, plaques, cable insulating materials, sports articles, garden furniture, sheets, construction components, vehicle parts and machines and containers of all kinds, for example bottles. The preferred utility of the stabilised polyolefins of this invention is for automobile assembly (external and internal use) and garden furniture.

The invention is illustrated in more detail by the following Examples in which, and throughout the remainder of the description, parts and percentages are by weight, unless otherwise indicated.

EXAMPLE 1 to 12

The respective fillers are blended with the indicated additives, the macrocyclic compound and the polymer powder in the given ratios in a ®HENSCHEL laboratory mixer for 2 min at room temperature, and the blend so obtained is then compounded in a ®BERSTORFF extruder at a maximum temperature of 260° C. and 150 rpm to a granular formulation. The granular formulation is then processed to 2 mm plaques in an ®ENGEL injection moulding machine at a maximum temperature of 260° C.

The thermal stability of the samples is determined by storage in a calibrated circulating air oven (®HORO) at the given temperatures. The time to embrittlement is determined visually (Tables 1, 4 to 7 and 9).

The light stability of the specimens is determined by exposure in an ®ATLAS Ci65 Weather-Ometer. Conditions: 102 min dry, 18 min wet, black standard temperature 63° C. (Tables 2 and 3).

The gloss of the samples is measured with a ®MICRO-GLOSS device at an angle of reflectance of 60°. The time to 50% loss of gloss is determined (Table 8).

The surface roughness is determined with a roughness analyser (®HOMMEL). The time to 0.6 μm surface roughness is determined (Table 8).

TABLE 1

Sample: Polypropylene filled with 40% talc + 1% carbon black + 0.35% pentaerythritol ester of β-(3,5-di-tert-butyl-4-hydroxyphenyl)propionic acid + 0.1% tris (2,4-di-tert-butylphenyl)phosphite + 0.6% distearyl thiodipropionate + 0.05% calcium stearate + 0.03% hydrotalcite DHT-4A

|  | Ch. 966 | Days to embrittlement at 135° C. | 150° C. |
| --- | --- | --- | --- |
| Comparison | 0% | 44 | 12 |
| Example 1 | 0.3% | 65 | 19 |
| Example 2 | 1% | 103 | 33 |

TABLE 2

Sample: Polypropylene filled with 40% talc + 1% carbon black + 0.35% pentaerythritol ester of β-(3,5-di-tert-butyl-4-hydroxyphenyl)phosphite + 0.6% distearyl thiodipropionate + 0.05% calcium stearate + 0.03% hydroptalcite DHT-4A

|  | Ch. 966 | Hours weathering |
| --- | --- | --- |
| Comparison | 0% | 2500 |
| Example 3 | 0,5% | 2400 |

TABLE 3

Sample: Polypropylene filled with 40% talc + 0.5% titanium dioxide + 0.05% pentaerythritol ester of β-(3,5-di-tert-butyl-4-hydroxyphenyl)propionic acid + 0.1% tris (2,4-di-tert-butylphenyl)phosphite + 0.15% bis(2,2,6,6-tetramethylpiperidyl)sebacate + 0.15% linear condensate of N,N'-bis(2,2,6,6-tetramethyl-4-piperidyl)hexamethylenediamine and 4-tert-octyl amino-2,6-dichloro-1,3,5-s-triazine + 0.05% of calcium stearate + 0.03% hydrotalcite DHT-4A

|  | Ch. 966 | Hours weathering |
| --- | --- | --- |
| Comparison | 0% | 3700 |
| Example 4 | 0.5% | 6000 |
| Example 5 | 1% | 9000 |

TABLE 4

Sample: Polypropylene filled with 40% talc + 0.5% carbon black + 0.05% pentaerythritol ester of β-(3,5-di-tert-butyl-4-hydroxyphenyl)propionic acid + 0.1% tris (2,4-di-tert-butylphenyl)phosphite + 0.3% n-octadecyl 3-(3,5-di-tert-butyl4-hydroxyphenyl)propionate + 0.6% distearyl thiodipropionate + 0.05% of calcium stearate + 0.03% hydrotalcite DHT-4A

|  | Ch. 966 | Days to embrittlment at 135° C. | 150° C. |
| --- | --- | --- | --- |
| Comparison | 0% | 52 | 17 |
| Example 6 | 1% | 112 | 27 |

TABLE 5

Sample: Polypropylene filled with 40% talc + 2% carbon black + 0.05% pentaerythritol ester of β-(3,5-di-tert-butyl-4-hydroxyphenyl)propionic acid + 0.1% tris(2,4-di-tert-butylphenyl)phosphite + 0.3% n-octadecyl 3-(3,5-di-tert-butyl4-hydroxyphenyl)propionate + 0.6% distearyl thiodipropionate + 0.05% calcium stearate + 0.03% hydrotalcite DHT-4A

|  | Ch. 966 | Days to embrittlement at 135° C. | 150° C. |
| --- | --- | --- | --- |
| Comparison | 0% | 34 | 12 |
| Example 7 | 1% | 85 | 26 |

TABLE 6

Sample: Polypropylene filled with 40% talc + 0.5% carbon black + 0.05% pentaerythritol ester of β-(3,5-di-tert-butyl-4-hydroxyphenyl)propionic acid + 0.1% tris(2,4-di-tert-butylphenyl)phospite + 0.2% of a condensate of 2-chloro-4, 6-bis(4-n-butylamino-1,2,2,6,6-pentamethyl-4-piperidyl)-1,3,5-triazine and 1,2-bis(3-aminopropylamino)ethane + 0.05% calcium stearate + 0.03% hydrotalcite DHT-4A

|  | Ch. 966 | Days to embrittlement at 135° C. | 150° C. |
| --- | --- | --- | --- |
| Comparison | 0% | 54 | 22 |
| Example 8 | 1% | 99 | 27 |

TABLE 7

Sample: Polypropylene filled with 40% talc + 2% carbon black + 0.05% pentaerythritol ester of β-(3,5-di-tert-butyl-4-hydroxyphenyl)priopionic acid + 0.1% tris(2,4-di-tert-butylphenyl)phosphite + 0.2% of a condensate of 2-chloro-4, 6-bis(4-n-butylamino-1,2,2,6,6-pentamethyl-4-piperidyl)-1,3,5-triazine and 1,2-bis(3-aminopropylamino)ethane + 0.05% calcium stearate + 0.03% hydrotalcite DHT-4A

|  | Ch. 966 | Days to embrittlement at 135° C. | 150° C. |
| --- | --- | --- | --- |
| Comparison | 0% | 38 | 19 |
| Example 9 | 1% | 81 | 26 |

TABLE 8

Sample: Polypropylene filled with 40% talc + 0.5% TiO$_2$ + 0.05% pentaerythritol ester of β-(3,5-di-tert-butyl-4-hydroxyphenyl)propionic acid + 0.1% of tris(2,4-di-tert-butylphenyl)phosphite + 0.15% of bis(2,2,6,6-tetramethyl-4-piperidyl)sebacate + 0.15% of a condensate of N,N'-bis(2,2,6,6-tetramethyl-4-piperidyl)hexamethylenediamine and 4-tert-octylamino-2,6-dichloro-1,3,5-s-triazine + 0.05% calcium stearate + 0.03% hydrotalcite DHT-4A

| | Ch. 966 | Hours of weathering to 0.6 μm surface roughness/50% loss of gloss | |
|---|---|---|---|
| Comparison | 0% | 3100 | 1600 |
| Example 10 | 1% | 8000 | 5500 |
| Example 11 | 2% | >10000 | 9000 |

TABLE 9

Sample: Polypropylene filled with 20% talc (superfine 5 microns) + 0.15% pentaerythritol ester of β-(3,5-di-tert-butyl-4-hydroxyphenyl)propionic acid + 0.1% tris(2,4-di-tert-butylphenyl)phosphite + 0.3% distearyl thiodipropionate + 0.1% calcium stearate

| | Ch. 966 | Days to embrittlement at 150° C. |
|---|---|---|
| Comparison | 0% | 8 |
| Example 12 | 1% | 21 |

Compounds used in the Examples

Ch. 966: Mixture of compounds

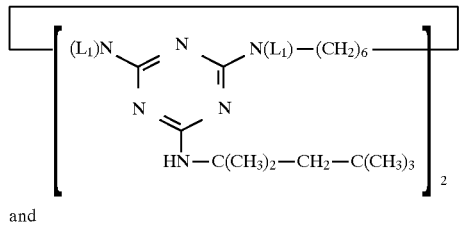

and

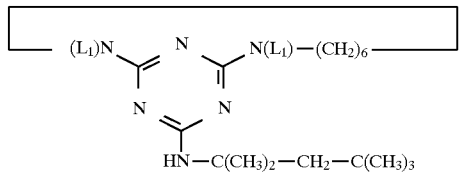

where L$_1$:

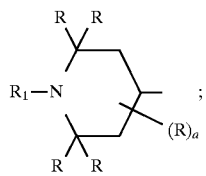

R: —CH$_3$; R$_1$: H; and a=0 in the ratio of 7:3.

What is claimed is:

1. A stabilised filled polyolefin composition comprising
   a) a polyolefin,
   b) talc filler,
   c) 0.01 to 2% by weight of at least one sterically hindered phenol and/or 0.01 to 2% by weight of at least one organic phosphite or phosphonite, and
   d) 0.01 to 5% by weight, based on the polymer, of a mixture of compounds of formulae VII-A and VII-B

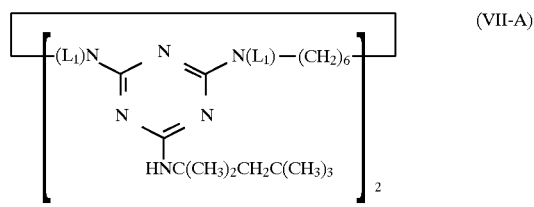

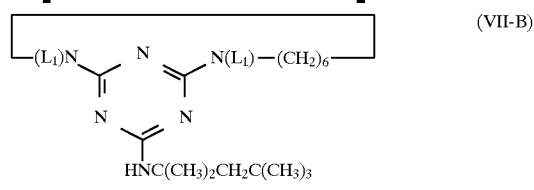

wherein L$_1$ is

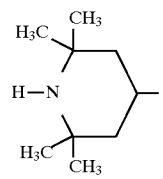

in a ratio of 7:3.

2. A stabilised filled polyolefin according to claim 1, which additionally contains an acid acceptor, a metal soap and/or a peroxide scavenger.

3. A stabilised filled polyolefin according to claim 1, which additionally contains a light stabiliser or UV absorber of the series of the benzophenones, benzotriazoles, oxanilides or of the linear sterically hindered amines.

4. A stabilised filled polyolefin according to claim 1, which is a filled polypropylene homopolymer or copolymer.

5. A stabilised filled polyolefin according to claim 1, which contains 5–75% by weight of filler.

6. A method of stabilising a talc filled polyolefin, which additionally contains 0.01 to 2% by weight of at least one sterically hindered phenol and/or 0.01 to 2% by weight of at least one organic phosphite or phosphonite, which comprises adding to the polyolefin 0.01 to 5% by weight, based on the polymer, a mixture of compounds of formulae VII-A and VII-B (VII-A)
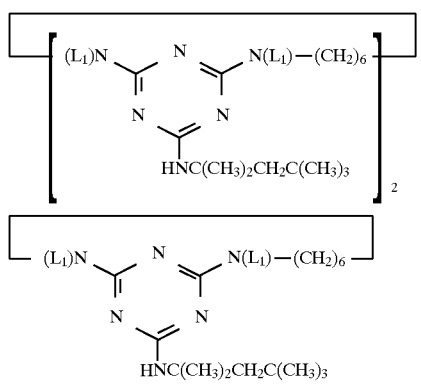
wherein $L_1$ is
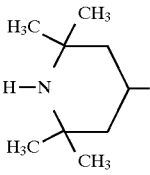
(VII-B)
in ratio of 7:3.
* * * * *